US011813810B2

(12) United States Patent
Hursit et al.

(10) Patent No.: US 11,813,810 B2
(45) Date of Patent: Nov. 14, 2023

(54) INDUCTION HEATING OF COMPOSITE PARTS

(71) Applicant: Zephyros, Inc., Romeo, MI (US)

(72) Inventors: Eren Hursit, Romeo, MI (US); Henry Richardson, Romeo, MI (US); Ken Mazich, Romeo, MI (US); Brendan Keenan, Romeo, MI (US); Joe Thomas, Romeo, MI (US); Brandon Madaus, Romeo, MI (US)

(73) Assignee: Zephyros, Inc., Romeo, MI (US)

( * ) Notice: Subject to any disclaimer, the term of this patent is extended or adjusted under 35 U.S.C. 154(b) by 210 days.

(21) Appl. No.: 16/633,810

(22) PCT Filed: Aug. 13, 2018

(86) PCT No.: PCT/US2018/046423
§ 371 (c)(1),
(2) Date: Jan. 24, 2020

(87) PCT Pub. No.: WO2019/036322
PCT Pub. Date: Feb. 21, 2019

(65) Prior Publication Data
US 2020/0164602 A1 May 28, 2020

Related U.S. Application Data

(60) Provisional application No. 62/545,452, filed on Aug. 14, 2017.

(51) Int. Cl.
| | | |
|---|---|---|
| *B29C 70/52* | (2006.01) | |
| *B29C 35/14* | (2006.01) | |
| *B29K 63/00* | (2006.01) | |
| *B29K 75/00* | (2006.01) | |
| *B29K 305/00* | (2006.01) | |
| *B29K 307/04* | (2006.01) | |

(52) U.S. Cl.
CPC ............ *B29C 70/528* (2013.01); *B29C 35/14* (2013.01); *B29K 2063/00* (2013.01); *B29K 2075/00* (2013.01); *B29K 2305/00* (2013.01); *B29K 2307/04* (2013.01)

(58) Field of Classification Search
CPC .................................................... B29C 70/528
See application file for complete search history.

(56) References Cited

U.S. PATENT DOCUMENTS

| | | | |
|---|---|---|---|
| 3,317,471 A | 5/1967 | Johnson | |
| 3,960,629 A * | 6/1976 | Goldsworthy | ...... B29C 35/0272 |
| | | | 156/180 |
| 4,438,254 A | 3/1984 | Doorakian et al. | |
| 4,647,648 A | 3/1987 | Silvis et al. | |
| 4,891,621 A | 1/1990 | Heckenkamp et al. | |
| 5,115,075 A | 5/1992 | Brennan et al. | |
| 5,176,865 A * | 1/1993 | Beall | ...... B29C 70/523 |
| | | | 427/434.6 |
| 5,338,497 A * | 8/1994 | Murray | ...... B29C 33/08 |
| | | | 264/486 |
| 6,011,111 A | 1/2000 | Brennan et al. | |
| 6,855,652 B2 | 2/2005 | Hable et al. | |
| 7,125,461 B2 | 10/2006 | Czaplicki et al. | |
| 7,318,873 B2 | 1/2008 | Czaplicki et al. | |
| 7,581,932 B2 | 9/2009 | Coupe et al. | |
| 8,365,862 B2 | 2/2013 | Coates et al. | |
| 9,033,101 B2 | 5/2015 | Coates et al. | |
| 9,315,930 B2 | 4/2016 | Coates et al. | |
| 9,546,439 B2 | 1/2017 | Coates et al. | |
| 2002/0121722 A1* | 9/2002 | Davies | ...... B29C 70/24 |
| | | | 264/129 |
| 2003/0003265 A1* | 1/2003 | Davies | ...... B29C 70/525 |
| | | | 428/113 |
| 2003/0039792 A1 | 2/2003 | Hable et al. | |
| 2007/0270515 A1 | 11/2007 | Chmielewski et al. | |
| 2009/0023870 A1* | 1/2009 | Berksoy | ...... B32B 27/08 |
| | | | 525/453 |
| 2009/0071593 A1* | 3/2009 | Slaback | ...... B29C 67/246 |
| | | | 156/180 |
| 2009/0202294 A1 | 8/2009 | Apfel | |
| 2010/0035017 A1* | 2/2010 | Green | ...... B29C 48/05 |
| | | | 428/114 |
| 2010/0289242 A1 | 11/2010 | Nitsche et al. | |
| 2011/0039470 A1 | 2/2011 | Wakeman et al. | |

(Continued)

FOREIGN PATENT DOCUMENTS

| | | |
|---|---|---|
| CN | 101636258 A * | 1/2010 |
| EP | 0747204 A2 * | 11/1996 |

(Continued)

OTHER PUBLICATIONS

Chinese First Office Action dated Jul. 21, 2021, Application No. 201880052450.1.

(Continued)

*Primary Examiner* — Jeffry H Aftergut
(74) *Attorney, Agent, or Firm* — The Dobrusin Law Firm, PC

(57) ABSTRACT

A forming process for composite parts comprising pultruding a resin and fiber material through a shortened pultrusion die, exposing the pultruded resin and fiber material to an induction heating coil aligned to be in-line with the pultrusion die to cure the resin and fiber material, wherein one or more of the resin and/or fiber material include a metallic component to facilitate cure via the induction heating coil.

16 Claims, No Drawings

(56) References Cited

U.S. PATENT DOCUMENTS

| | | | |
|---|---|---|---|
| 2011/0278802 A1 | 11/2011 | Nitsche et al. | |
| 2011/0319524 A1* | 12/2011 | Leibler | C08L 63/00 |
| | | | 523/400 |
| 2012/0251863 A1 | 10/2012 | Berger et al. | |
| 2015/0126646 A1* | 5/2015 | Hochstetter | B29C 70/48 |
| | | | 524/35 |
| 2015/0129116 A1* | 5/2015 | Richeton | B60R 19/12 |
| | | | 156/180 |

FOREIGN PATENT DOCUMENTS

| | | |
|---|---|---|
| EP | 2905122 A1 | 8/2015 |
| WO | 98/14498 A1 | 4/1998 |
| WO | 2007/008569 A1 | 1/2007 |
| WO | 2017/007823 | 1/2017 |

OTHER PUBLICATIONS

PCT Search Report & Written Opinion dated Nov. 23, 2018, Application No. PCT/US2018/046423.

India First Examination Report dated Jan. 3, 2022, Application No. 202037002410.

Brazil Office Action dated May 9, 2023, Application No. 112020001795-7.

* cited by examiner

INDUCTION HEATING OF COMPOSITE PARTS

TECHNICAL FIELD

The present teachings relate generally to the formation of composite structures utilizing an induction heating step. More particularly, the teachings are directed to composites formed by extrusion and/or pultrusion with an in-line induction heating step.

BACKGROUND

Efforts to reduce the weight of most modes of transportation has led to an increased use of polymeric materials throughout transportation vehicles in an effort to minimize heavy metallic structures. The manufacture of these polymeric structures typically involves the use of costly molds and extreme temperatures for injection molding processes. Further, a change to the shape and/or size of a part typically requires a new mold and thus significant added time and cost.

Extrusion and pultrusion processes for the formation of polymeric composite parts are also known, yet these processes require significant large machinery and long cycle times to assure adequate curing of the composite parts.

Examples of composite structures are illustrated in PCT Publication No. WO2007/008569, United States Published Patent Application Nos. 2011/0039470 and 2012/0251863, and U.S. Pat. No. 7,581,932 all incorporated by reference for all purposes. See also, U.S. Pat. Nos. 6,855,652, 7,125,461 and 7,318,873, and United States Published Patent Application Nos. 2003/0039792, 2010/0289242, 2011/0278802, and 2009/0202294, incorporated by reference for all purposes.

The present application also is related to and incorporates by reference for all purposes Great Britain Patent Application No. 1318595.4, filed Oct. 21, 2013.

Further to the above, thermoplastic polymers having at least one epoxide group have been described in U.S. Pat. Nos. 5,115,075; 4,438,254; 6,011,111; and PCT Publication No. WO98/14498 (see e.g., pages 3-8) along with illustrative synthesis conditions, all incorporated by reference herein (see also U.S. Pat. Nos. 3,317,471 and 4,647,648, also incorporated by reference herein). Examples of such materials also can be found, without limitation at paragraphs 15-25 of Published U.S. Patent Application No. 2007/0270515, incorporated by reference for all purposes.

PCT Publication No. WO2017/007823 discloses the use of induction heating for a variety of adhesives and polymeric substrates and is incorporated by reference herein for all purposes.

What is needed is a polymeric part formation system that allows for formation without the use of molds and without the lengthy cycle time of pultrusion and extrusion, while still including a heating step to assist in curing the composite structures.

SUMMARY OF THE INVENTION

One or more of the above needs are met by the present teachings which contemplate composite structures and methods for the manufacture of these composite structures that utilize an induction heating step during manufacture.

The polymeric composites described herein may include one or more fibers. These fibers may be metallic fibers. These fibers may be carbon fibers. These fibers may be fibers that facilitate heating of the composites by induction heating. The fibers may be located in a resin material and thus upon exposure to an inductive heating coil, the fibers may act to heat the surrounding resin. In the event that metallic fibers are used (for example, carbon fibers) the remaining composite may be free of additional metallic compounds.

The resins utilized for the composite structures described herein typically require heat for curing or post thermoformable processing. While these resins often contain fibers (e.g., glass fibers), these fibers are usually thermally insulating, resulting in longer heating times, longer curing times and heterogeneous heat distribution. The structures and induction heating system described herein may facilitate more homogenous heating and faster heating of the entire structure.

As one option, metallic compounds may be homogenously mixed into the resin and thereafter heated by induction to cause heating of the resin. Induction heating of these metallic compounds occurs much more quickly than conductive heating. Induction heating of the metallic compounds (e.g., particles) which are homogenously distributed through the resin, will provide homogenous heating through the entire structure. This induction heating process minimizes the effects of non-homogenous heat distribution and the insulating behavior of the reinforcement fibers. Further, by minimizing the temperature variation within the structure, the homogenous heat distribution may minimize the internal stress variations and may minimize warping of the composite.

Induction heating systems which are integrated into the manufacturing process may provide heating for post forming and/or curing of a thermoplastic/thermoset resin composite systems. Induction heating may further provide heat to melt a thermoplastic/thermoset resin for the post-bonding applications. Induction heating may facilitate faster curing, thus allowing for significant reduction of tool and manufacturing line length in the case of extrusion and pultrusion systems. The induction coil may be arranged so that it is in-line with the extrusion/pultrusion line. Thus the extrusion/pultrusion die need only provide initial shape to the composite (e.g., by "skinning" or curing just the exterior of the part) as opposed to shaping and curing throughout the part. The length of the extrusion/pultrusion die can thus be shortened, requiring only a length for shaping while the cure can be performed outside of the die by an in-line induction coil.

The induction heating system described herein may allow for non-metallic attachments to be post-bonded on the thermoplastic resin systems. The induction heating system may allow for the use of lower cost materials for one or more elements of the tooling. For example, one or more portions of the tooling may be formed of one or any combination of ceramic, cast-amide, polyamide, or the like as opposed to a full metal tool.

The efficiency of the induction heating process can be adjusted by modifying the density of the metallic compounds/particles. The efficiency of the induction heating process can be adjusted by the use of metallic coated reinforcement fibers or metallic filaments.

The use of metallic compound/particles may also provide for improved mechanical properties of the resulting composite part. The use of metallic coated reinforcement fibers or metallic filaments as reinforcement fibers may also provide for improved mechanical properties of the resulting composite part.

The addition of metallic compounds/particles may add weight to the overall parts, and thus the amount of metallic compound should be just sufficient for induction forming/ curing while avoiding significant addition of weight. The addition of metallic materials may also result in corrosion, where none was present previously with wholly polymeric parts. Additional steps may also need to be taken to assist the resin in binding to any metallic reinforcing fibers if utilized. In addition, it may be necessary to take steps to align fibers and/or distribute metallic particles evenly so that heat is extended evenly into the part without "scorching" some areas of the part while others may not fully cure. Further, in the event that metallic compounds/particles are utilized, they may have a tendency to filter out of the resin due to their higher density. Thus, a component may be added to the composite for adjusting density of one or more of the resin and/or the metallic particles so that the densities of both are more evenly matched.

The induction heating systems described herein may be utilized on any composite structure that is activated, cured, shaped, reformed, and/or recycled by the addition of heat.

In an effort to more evenly heat the entirety of the part, it is possible that a small die insert may be inductively heated while the remainder of the tool/die is made from a thermally insulating material (e.g., plastic). In this case it may be possible to internally generate heat and also generate heat in the die insert that would be transferred to the material by conduction, thus having two inductive heating mechanisms in the pultrusion process at the same time. Also possible would be inductive heating of both the extrusion/pultrusion tool and material by what would traditionally be a resin transfer molding process or a traditional thermal stamping process.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 62/545,452, filed Aug. 14, 2017, the contents of that application being hereby incorporated by reference for all purposes.

The present application is also related to the teachings of PCT Application No. PCT/US14/070853, filed Dec. 17, 2014; U.S. Provisional Application Ser. No. 61/916,884, filed on Dec. 17, 2013; and PCT Application No. PCT/US14/61531, filed Oct. 21, 2014, the contents of these applications being hereby incorporated by reference for all purposes.

The composites described herein may be formed utilizing an in-line induction heating process to shape and/or cure a composite structure. The induction heating process may be utilized as a low cost means to reduce line length and cycle time in traditional molding, extrusion and/or pultrusion processes. The composites may include one or more resin materials and one or more fiber structures. The composites may also include additional layers such as adhesive or sealant layers. Such adhesive or sealant layers may be activatable to foam and/or cure. The one or more adhesive or sealant layers may be activatable at ambient temperatures (e.g., a "foam in place" adhesive). Alternatively, the activatable adhesive or sealant may be activated using a stimulus (e.g., heat via induction). The one or more adhesive layers may be a pumpable adhesive. The one or more adhesive or sealant layers may be formed as a film. The one or more adhesive or sealant layers may be extruded or pultruded.

The resin may be a thermoplastic or thermoset resin. The resin may include a flame retardant component. The resin may include a metallic component, which may be a particulated metallic component or may be formed as fibers. The metal component may be iron particles. The metallic component may be carbon fibers.

The composites may be formed utilizing a plurality of reinforcement fibers which may be impregnated with one or more of the adhesive or a resin, which may be a thermoplastic or thermoset resin. The composites may be thermoformed as a pre-preg. The pre-preg may include a thermoplastic material which may be a thermoplastic material including at least one epoxide group. The composites may be formed utilizing a one or more fibrous materials, which may a lofted non-woven fibrous material, such as those described in U.S. Pat. Nos. 8,365,862; 9,033,101; 9,315,930; and 9,546,439, the contents of which are incorporated by reference herein for all purposes. The fibrous material may be a woven material. The fibrous material may have a wicking property. The fibrous material of may be used for gap filling or as matrix for a liquid resin. The fibers may be bonded together by an adhesive and/or resin material. The resin may be an acrylic resin, an epoxy resin, or any combination thereof. The composites may be formed of a thermoset material. The composites may be formed of a polyurethane material.

The composites may include one or more materials for sealing the composites. The sealant material may be an activatable material that expands and/or cures upon exposure to a stimulus. The adhesive may be a material that also seals. The composites may include adhesives, sealants, resins, or other materials/structures that facilitate the bonding of dissimilar materials.

The composites may include materials that can be recycled after use. Specifically, the composites may be substantially free of any thermoset materials. The composites may include one or more thermoplastic materials that can be heated to be recycled.

The composite materials described herein may also include fibrous materials that employ a distributed phase (e.g., a fibrous phase) and a thermoplastic polymeric material (e.g., a reformable resin, a thermoplastic reaction product having at least one epoxide group). The material offers the benefit of mechanical properties typically achieved through the use of thermoset polymeric materials (e.g., a thermoset epoxy material) as some or all of a matrix phase of a composite. However, the material has a number of physical attributes that make it suitable for handling, processing and/or post-useful life reclamation, recycling, and/or re-use.

The teachings herein provide for induction heating of pultruded, extruded, and/or molded composite structures.

The teachings herein also provide for a method of making such a structure on an in-line induction heating and pultrusion system comprising one or more of the following: pulling a plurality of continuous fibers through a die for defining a continuous profile; introducing an induction coil to the profile for shaping and/or curing the profile; molding one or more securing devices and fastening devices onto the continuous profile; and extruding a secondary material onto the continuous profile.

The method may include heating the profile with an induction coil to join to a secondary component. The method may include pultruding the profile and then heating the profile to cure the profile. The profile may include a conductive component. The plurality of fibers may mitigate the difference in thermal expansion between the profile and any secondary component attached thereto. The profile may be installed in a vehicle after the vehicle has completed a paint bake oven treatment.

The teachings contemplate the possibility that a structure may be fabricated using a thermoplastic or thermoset material in accordance with the teachings generally herein. In particular, the structure may be made from a thermoplastic or thermoset material in accordance with the present teachings that is reinforced with a reinforcement phase (e.g., a metallic component as described herein). The reinforcement phase may be distributed in a matrix of the thermoplastic or thermoset material (e.g., a polyamide, a polyurethane and/or a reformable resin material as described herein). For example, the reinforcement phase may be at least a majority (by volume) of the total material. It may be greater than about 60% by volume or greater than about 70% by volume. It may be below about 90% by volume, below about 80% by volume, or below about 70% by volume. Any reinforcement phase may be distributed randomly, generally uniformly, and/or in one or more predetermined locations of the part.

The ratio by weight of polymeric resin to the fibers may be range from about 1:10 to about 100:1 (e.g., it may range from about 1:5 to about 10:1, about 1:3 to about 5:1, or even about 1:2 to about 2:1).

The material of the distributed phase may include an organic material, an inorganic material or a combination of each. The material may be a naturally occurring material (e.g., a rubber, a cellulose, sisal, jute, hemp, or some other naturally occurring material). It may be a synthetic material (e.g., a polymer (which may be a homopolymer, a copolymer, a terpolymer, a blend, or any combination thereof)). It may be a carbon derived material (e.g., carbon fiber, graphite, graphene, or otherwise). The distributed phase may thus include fibers selected from (organic or inorganic) mineral fibers (e.g., glass fibers, such as E-glass fibers, S-glass, B-glass or otherwise), polymeric fibers (e.g., an aramid fiber, a cellulose fiber, or otherwise), carbon fibers, metal fibers, natural fibers (e.g., derived from an agricultural source), or any combination thereof. The plurality of elongated fibers may be oriented generally parallel to each other. They may be braided. They may be twisted. Collections of fibers may be woven and/or nonwoven.

The material of the distributed phase may include a plurality of fibers having a length of at least about 1 cm, 3 cm or even 5 cm or longer. Fibers of the distributed phase may have an average diameter of about 1 to about 50 microns (e.g., about 5 to about 25 microns). The fibers may have a suitable sizing coating thereon. The fibers may be present in each layer, or in the fibrous insert generally, in an amount of at least about 20%, 30%, 40% or even 50% by weight. The fibers may be present in each layer, or in the fibrous insert generally, in an amount below about 90%, 80%, or even about 70%, by weight. By way of example, the fibers may be present in each layer, or in the fibrous insert, in an amount of about 50% to about 70% by weight. Fiber contents by weight may be determined in accordance with ASTM D2584-11.

Tapes and/or sheets (e.g., films) for use in one or more of the portions of a fibrous composite material herein may be made by extrusion, pultrusion or otherwise. In this manner, it may be possible to achieve ordering of the fibers in the tapes and/or sheets. The tape and/or sheet may be formed from the thermoplastic polymer material. The tape and/or sheet may include a fibrous phase or may alternatively be substantially free of any fibrous phase.

The fibrous composite materials of the present teachings may include one or more layers (e.g., they may have 2, 3, 4, 6, or 15 or more layers) that are consolidated in the sense that they include a plurality of individual fibers or other segmented forms of a distributed phase, which are distributed in a cohesive mass of the polymeric matrix material. Multiple layers may be consolidated together so that a cohesive mass, including the multiple layers, is formed. The multiple layers may be consolidated so as to form a predetermined shape in the form of a three-dimensional shaped insert. For instance, the fibrous insert may employ a plurality of layers that include a plurality of elongated fibers (e.g., having a length of at least 1 cm, 3 cm or even 5 cm or longer) that are oriented generally parallel or generally unidirectionally to each other and are distributed in a generally continuous polymeric matrix (e.g., in a continuous matrix of the second polymeric material). A shaping operation (e.g., thermoforming, molding, passing through a die, rolling, or otherwise) may be performed. The shaping operation may further include a step of curving the composite.

It is possible that one or more of the resin or fibers may include a metallic filler material that assists in heating the material. Such metallic filler material may include any suitable metallic filler, but may specifically include one or any combination of nickel, ferrite, zinc, manganese, or iron. The metallic filler may comprise a significant portion of the resin and/or fibers. The magnetic filler may be present in amount of at least 10% by weight of the total resin and/or fibers. The magnetic filler may be present in amount of at least 20% by weight of the total resin and/or fibers. The magnetic filler may be present in amount of at least 30% by weight of the total resin and/or fibers. The magnetic filler may be present in amount of at least 40% by weight of the total resin and/or fibers. The magnetic filler may be present in amount of less than 80% by weight of the total resin and/or fibers. The magnetic filler may be present in amount of less than 60% by weight of the total resin and/or fibers. The magnetic filler may be present in amount of less than 50% by weight of the total resin and/or fibers.

The materials useful in the present teachings may have a relatively low glass transition temperature (TO. It may be possible to have a $T_g$ below about 100° C., below about 90° C., below about 80° C., below about 70° C., or even below about 65° C., as measured by differential scanning calorimetry according to ASTM E1356-08(2014). The material of the present teachings may have a glass transition temperature as measured by differential scanning calorimetry according to ASTM E1356-08(2014) of at least about 45° C., at least about 55° C., or even at least about 60° C. The use of such materials has the ability to enhance productivity substantially. Energy consumption can be reduced. Build times can be shortened. Still, the resulting materials could result in materials having very attractive mechanical and/or self-adhering characteristics.

The resulting composites may exhibit one or any combination of the following characteristics: a tensile strength at yield (according to ASTM D638-14) of at least about 15 MPa (e.g., at least about 30 MPa or 45 MPa), a tensile elongation strength at break (according to ASTM D638-14) of at least about 40 MPa (e.g., at least about 45 or 55 MPa); an elongation at break (according to ASTM D638-14) of at least about 15% (e.g., at least about 20%, 25 or 30%); and/or a tensile modulus of elasticity (according to ASTM D638-14) of at least about 0.5 GPa, (e.g., at least about 1 GPa, 1.8 GPa, or 2.7 GPa).

A method for making an article in accordance with the present teachings may be performed in a continuous manner. For example, fibrous material from a continuous supply (e.g., a reel of the desired fibrous material (e.g., in its desired form, such as a strand, a yarn, a weave, nonwoven mat, or otherwise as described herein) for use as the distributed phase) may be fed continuously to and through a die. The fibrous material may be contacted (e.g., by way of a suitable coating operation, such as roll coating, or otherwise) with a resin or reaction product prior to or at the time when the fibrous material is passed through the die. The fibrous material may be contacted (e.g., by way of a suitable coating operation, such as roll coating, or otherwise) with the reactants for a polymer reaction product prior to or at the time when the fibrous material is passed through the die. Upon exiting the die, a composite mass results. At this point only the exterior of the mass may be cured or "skinned" while contact with an induction coil completes the curing process, resulting in shorter time and shorter line length.

As can be appreciated, a variety of suitable composite profiles are possible as a result of the teachings. The profiles may include a longitudinal axis. The composite profiles may be symmetric or asymmetric relative to the longitudinal axis. The composite profiles may include one or more longitudinally oriented ribs. The composite profiles may include one or more transversely extending flanges. The composite profiles may have one or more outer surfaces. The composite profile may have one or more inner surfaces. The composite profiles may include a composite overlay that includes or consists of a composite mass of the present teachings. The composite profiles of the teachings may include a composite overlay that includes or consists of a composite mass of the present teachings. The composite overlay may cover all or part of an outer or inner surface. The composite overlay may include or consist of a composite mass of the present teachings may define all or part of a rib, a flange (e.g., a transversely oriented flange) or both. The composite profiles may include a composite mass that is at least partially or even completely embedded within the base material over some or all of the length of the composite profile.

Other materials for forming the composites described herein include a polyamide, a polyolefin (e.g., polyethylene, polypropylene, or otherwise), a polycarbonate, a polyester (e.g., polyethylene terephthalate), an epoxy based material, a thermoplastic polyurethane, a carbon fiber reinforced polymer or any combination thereof. It may be preferred to employ a polyamide (e.g., polyamide 6, polyamide 6,6, polyamide 9, polyamide 10, polyamide 12 or the like). The materials of a composites and any layer, overlay and/or insert may be generally compatible with each other in that they are capable of forming a mechanical or other physical interconnection (e.g., a microscopic interconnection) between them, they are capable of forming a chemical bond between them, or both. For example, the first and second materials may be such that they fuse together (e.g., in the absence of any adhesive) when heated above their melting point and/or their softening point. The composites may also be overmolded with a secondary material, such secondary material may be a polymeric material such as a polyolefin, a polyamide, a polyester, a polyurethane, a polysulfone, or the like, or an expandable polymer (e.g., a structural foam or an acoustic foam).

Desirably each of the adjoining layers are joined together as a cohesive mass. For instance, each of the layers may be bonded together by the resin material of the respective layers to form a series of continuous layers. The layers may be bonded together in the absence of any adhesive.

The resulting composite structure may be any of a number of suitable forms. For example, it may be an elongated part. It may have a length and may be solid along all or part of the length. It may have a length and be hollow along all or part of the length. The structure may have a wall thickness, measured from a first exposed surface to a generally opposing exposed surface. The wall thickness may be at least about 0.5 mm, about 1 mm, about 2 mm, about 5 mm, about 10 mm, or about 20 mm. The wall thickness may be below about 100 mm, below about 80 mm, below about 60 mm, or below about 40 mm.

The structure may have a predetermined shape. The shape may include one or more elongated portions. The shape may include one or more hollow portions. The shape may include one or more walls that define at least one cavity. The structure may include a plurality of portions each having a different shape. The structure may be configured to define a fascia, which optionally may be supported by an underlying structure. The structure may be configured to define a support that underlies a fascia.

Heat may be applied in any suitable way. One approach may be to employ localized heating. For example, it is possible to employ induction heating for selectively heating at least a portion of the above-described structure. To illustrate, it is possible that the structure will be made with a polymer (e.g., a polyamide and/or a reformable resin material as taught herein, which may be reinforced as described herein, such as with a fiber or other phase), and will have a wall thickness. A metallic item (which may be a component desired to be attached to the structure) may be brought into proximity (which may or may not be in contacting relation) with the structure at the desired location of attachment. An induction heating device may be brought into proximity with the metallic item for heating the metallic item, which in turn will heat the structure in the affected location when power is supplied to the induction heating device. Other heating devices may be employed as well for achieving localized heating.

The structures described herein may include dissimilar materials. For example, one part may include a resin material of the present teachings. The other part may include a polyurethane, a polyolefin (e.g., a polypropylene), a polyamide, an acrylate, a methacrylate, a polycarbonate, a polyester, or any combination thereof; the other part may include a thermoset material; the other part may be made form a sheet molding compound.

The method may include a step of at least partially shaping the composite structure. For example, a tool may be preheated to a temperature above the softening temperature and/or the melting temperature of a polymer of the at least one composite layer prior to placing the composite in the cavity of the tool. The method may include a step of at least partially shaping the composite after it is placed in the cavity of the tool and while molding the mass of polymeric material. For instance, heat and/or pressure that results from introducing the mass of polymeric material into the cavity (e.g., by induction heating), may at least partially cause the composite to assume a shape dictated by one or more of the walls defining the cavity. Thus it is possible that the composite is not preformed prior to placement in the cavity, and it assumes its final shape only while in the cavity.

It is contemplated that the materials as disclosed herein may be paintable. Paintability may be desirable, for example, if any surface is visibly exposed. The material may be ink jet printed. The material may be paintable, as it may have an affinity for taking paint. This may be due, at least in part, to the polarity of the material and/or the hydroxyl functionality of the backbone (e.g., generally linear backbone polymer chain) in the event that the matrix material is a reformable resin.

Parts herein may be employed for any of a number of purposes. For example, they may be employed to structurally reinforce a transportation vehicle such as an automotive vehicle. In this regard, a part may be placed in a cavity of a vehicle body structure, such as a vehicle frame. After applying an e-coat layer to the vehicle body (e.g., within the cavity), the part may be subjected to heat from a bake oven, which causes the activatable material to activate (e.g., expand and fill the cavity), and become bonded to the vehicle body.

The manufacturing system may also include one or more induction heating steps and one or more pultrusion steps. By way of example, a possible manufacturing system may be employed for an induction heating step to shorten the time and size of the pultrusion and/or extrusion operation. Raw material for forming a base polymeric material body may be fed into a receptacle associated with a pultruder. The pultruder may have a die through which the raw material is passed to form a shaped body profile (e.g., a pultruded profile). A mass of fibers may be pulled through the die and infiltrated while in the die with the raw material. The raw material (which may be a one-component or a plural-component mixture of reactive ingredients) may have a relatively low viscosity sufficient to allow the raw material to impregnate the mass of fibers and thereafter the exterior may cure enough just to hold the shape of the profile. The profile may then be heated and fully cured outside of the die via an induction coil. A feed system may feed a fibrous material (e.g., by way of rollers) to the die at which the raw material for forming a polymeric matrix is contacted with the fibrous material (e.g., the mass of fibers). In an instance, where the pultruded material has thermoplastic characteristics (e.g., a thermoplastic epoxy) a forming roller (or another suitable extrusion type shaping device) may then further define the desired shape of the resulting fibrous composite material. The forming roller may also serve to help join the fibrous composite material with any optional shaped base body profile.

Turning now to a discussion in more detail of forming profiled products using a thermoplastic or thermoset material in accordance with the general teachings of that material herein, there is envisioned a method of combining reactants and contacting the combined reactants and/or reaction product of the reactants with a mass of fibers in the presence of an induction heating coil.

Though some teachings herein are described in connection with a thermoplastic epoxy, the teachings herein are more general and may apply to pultruding other materials as well such as thermoset materials. Examples of other materials may include polyesters, polyurethanes, epoxies, or otherwise. The die may be about 0.1 to about 1 (e.g., 0.2) meters in length. The rate of the pultruding is at least about 0.5 (1, 2 or 3) meters per minute. The die may include an opening therein into which the reactants are introduced so that the step of contacting occurs within the die.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A method of making an article comprising:
feeding a fibrous material from a continuous supply through a pultrusion die, said pultrusion die having a length of less than 1.0 meters, an inductively heated die insert, a tool housing made from a thermally insulating material, and an opening therein into which a reactant may be introduced and feeding said fibrous material at a rate of at least 0.5 meters per minute;
contacting the fibrous material with a resin when the fibrous material is passed through the pultrusion die, forming a composite mass with a skinned exterior via the inductively heated die insert upon exit from the pultrusion die; and
contacting the composite mass with an in-line induction coil to complete a curing process;
wherein the resin includes a metallic component to facilitate cure via the inductively heated die insert and the in-line induction heating coil.

2. The method of claim 1, wherein the metallic component is a fiber component.

3. The method of claim 2, wherein the fiber component is glass fibers.

4. The method of claim 1, wherein the metallic component is a particulated component.

5. The method of claim 4, wherein the particulated component is iron particles.

6. The method of claim 1, wherein the fiber material is a carbon fiber.

7. The method of claim 6, wherein the length of the pultrusion die is less than about 0.4 meters.

8. The method of claim 6, wherein the resin also includes a reformable epoxy resin material.

9. The method of claim 1, wherein the in-line induction heating coil is located immediately adjacent the pultrusion die.

10. The method of claim 9, wherein the metallic component includes an iron material.

11. The method of claim 10, wherein the method forms an elongated hollow part.

12. The method of claim 1, wherein the part is at least partially uncured prior to exposure to the in-line induction coil.

13. The method of claim 1, comprising:
a) pulling a plurality of continuous fibers of the fiber material through the pultrusion die for defining a continuous profile that has at least two portions that are not coplanar and have differing thicknesses relative to each other;
b) contacting the plurality of continuous fibers with the reactant to react for continuously forming a polymeric matrix of a resulting pultruded article.

14. The method of claim 13, wherein the plurality of continuous fibers comprise a metallic component.

15. The method of claim 13, wherein a secondary component is attached to the profile prior to exposure to the in-line induction heating coil.

16. The method of claim 13, wherein a secondary component is attached to the profile after exposure to the in-line induction heating coil.

* * * * *